United States Patent
Kim et al.

(10) Patent No.: US 9,436,076 B2
(45) Date of Patent: Sep. 6, 2016

(54) MULTI-PROJECTION SYSTEM FOR EXTENDING VISUAL ELEMENT OF MAIN IMAGE

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

( * ) Notice: Subject to any disclaimer, the term of this patent is extended or adjusted under 35 U.S.C. 154(b) by 124 days.

(21) Appl. No.: 14/219,721

(22) Filed: Mar. 19, 2014

(65) Prior Publication Data
US 2014/0320825 A1    Oct. 30, 2014

(30) Foreign Application Priority Data
Apr. 30, 2013   (KR) .................. 10-2013-0048087

(51) Int. Cl.
| | |
|---|---|
| H04N 9/31 | (2006.01) |
| G03B 31/00 | (2006.01) |
| H04N 21/41 | (2011.01) |
| H04N 5/445 | (2011.01) |
| E04H 3/22 | (2006.01) |

(Continued)

(52) U.S. Cl.
CPC ............ *G03B 31/00* (2013.01); *A47C 1/12* (2013.01); *A47C 3/18* (2013.01); *A63J 25/00* (2013.01); *E04H 3/22* (2013.01); *G02B 27/2271* (2013.01); *G03B 21/003* (2013.01); *G03B 21/14* (2013.01); *G03B 21/206* (2013.01); *G03B 21/2053* (2013.01); *G03B 21/26* (2013.01); *G03B 21/56* (2013.01); *G03B 21/60* (2013.01); *G03B 21/608* (2013.01); *G03B 29/00* (2013.01); *G03B 41/00* (2013.01); *H04N 5/44591* (2013.01); *H04N 9/3147* (2013.01); *H04N 9/3182* (2013.01); *H04N 9/3185* (2013.01); *H04N 9/3194* (2013.01); *H04N 21/4122* (2013.01); *A63J 2005/002* (2013.01); *G03B 37/04* (2013.01)

(58) Field of Classification Search
CPC .......... H04N 9/3147; H04N 5/44591; H04N 21/4122

See application file for complete search history.

(56) References Cited

U.S. PATENT DOCUMENTS

| | | | | |
|---|---|---|---|---|
| 2,280,206 A | * | 4/1942 | Waller | ................... G03B 37/00 352/36 |
| 4,962,420 A | * | 10/1990 | Judenich | ................ G03B 21/00 348/218.1 |

(Continued)

FOREIGN PATENT DOCUMENTS

| | | | |
|---|---|---|---|
| JP | WO 9953728 A1 * | 10/1999 | ......... H04N 21/4131 |
| JP | 2005204165 A | 7/2005 | |

(Continued)

OTHER PUBLICATIONS

Korean Office Action for application No. 10-2013-0048087 dated May 1, 2014.

(Continued)

*Primary Examiner* — Bao-Luan Le
(74) *Attorney, Agent, or Firm* — Hauptman Ham, LLP

(57) ABSTRACT

The present invention provides a multi-projection system for extending a visual element of a main image, the system including a main projection surface on which a main image is reproduced and an auxiliary projection surface arranged around the main projection surface, in which a visual element associated with the main image is displayed on the auxiliary projection surface.

18 Claims, 7 Drawing Sheets

(51) Int. Cl.
*G03B 21/56* (2006.01)
*G02B 27/22* (2006.01)
*G03B 21/26* (2006.01)
*G03B 21/608* (2014.01)
*G03B 21/14* (2006.01)
*A47C 1/12* (2006.01)
*A47C 3/18* (2006.01)
*A63J 25/00* (2009.01)
*G03B 29/00* (2006.01)
*G03B 41/00* (2006.01)
*G03B 21/00* (2006.01)
*G03B 21/20* (2006.01)
*G03B 21/60* (2014.01)
*A63J 5/00* (2006.01)
*G03B 37/04* (2006.01)

(56) References Cited

U.S. PATENT DOCUMENTS

| | | | | |
|---|---|---|---|---|
| 4,974,779 A * | 12/1990 | Araki | | G03B 21/608 239/18 |
| 5,067,653 A * | 11/1991 | Araki | | G03B 21/608 239/18 |
| 5,265,802 A * | 11/1993 | Hobbs | | B05B 1/267 239/18 |
| 5,445,322 A * | 8/1995 | Formhals | | G03B 21/60 239/18 |
| 6,611,297 B1 * | 8/2003 | Akashi | | H04N 21/4131 348/602 |
| 6,819,487 B2 * | 11/2004 | Palovuori | | G03B 21/608 353/28 |
| 6,988,339 B2 * | 1/2006 | Pylkki | | E06B 7/28 348/E5.13 |
| 7,180,529 B2 * | 2/2007 | Covannon | | G06F 3/1423 345/690 |
| 7,262,813 B2 * | 8/2007 | Sato | | B60R 11/02 348/602 |
| 7,894,000 B2 * | 2/2011 | Gutta | | G06T 7/408 348/553 |
| 7,932,953 B2 * | 4/2011 | Gutta | | H04N 9/73 348/602 |
| 8,154,669 B2 * | 4/2012 | Wang | | H04N 9/73 348/801 |
| 8,164,830 B2 * | 4/2012 | Astill | | G03B 21/58 160/241 |
| 8,310,756 B2 * | 11/2012 | Choi | | G03B 21/60 181/0.5 |
| 8,328,368 B2 * | 12/2012 | Luciano | | G03B 21/10 353/79 |
| 8,356,902 B2 * | 1/2013 | Paulussen | | G03B 21/13 348/744 |
| 8,576,340 B1 * | 11/2013 | Li | | H04N 5/58 348/602 |
| 8,599,313 B2 * | 12/2013 | Barenbrug | | H04N 5/44591 348/563 |
| 8,928,811 B2 * | 1/2015 | Li | | H04N 21/43 348/602 |
| 9,197,918 B2 * | 11/2015 | Li | | H04N 21/43 |
| 9,220,158 B2 * | 12/2015 | Van Herpen | | H05B 37/029 |
| 2002/0135739 A1 * | 9/2002 | Standard | | E04H 3/22 353/46 |
| 2003/0145536 A1 * | 8/2003 | Pylkki | | E06B 7/28 52/201 |
| 2004/0080820 A1 * | 4/2004 | Palovuori | | G03B 21/608 359/443 |
| 2005/0041164 A1 * | 2/2005 | Sato | | B60R 11/02 348/744 |
| 2005/0206856 A1 | 9/2005 | Ishii | | |
| 2006/0126028 A1 * | 6/2006 | Ullman | | G03B 21/28 353/69 |
| 2007/0091111 A1 * | 4/2007 | Gutta | | H04N 5/58 345/591 |
| 2007/0242162 A1 * | 10/2007 | Gutta | | G06T 7/408 348/645 |
| 2009/0015799 A1 * | 1/2009 | Luciano | | G03B 21/10 353/79 |
| 2009/0066858 A1 | 3/2009 | Turner et al. | | |
| 2009/0175536 A1 * | 7/2009 | Gutta | | H04N 9/73 382/166 |
| 2010/0005062 A1 * | 1/2010 | Van Den Dungen | | G06F 17/30265 707/E17.014 |
| 2010/0201878 A1 * | 8/2010 | Barenbrug | | H04N 5/44591 348/563 |
| 2010/0208211 A1 * | 8/2010 | Paulussen | | G03B 21/13 353/29 |
| 2011/0190911 A1 * | 8/2011 | Iwanami | | H04N 21/235 700/90 |
| 2011/0309999 A1 * | 12/2011 | Chang | | G03B 21/13 345/1.1 |
| 2012/0098937 A1 | 4/2012 | Sajadi et al. | | |
| 2012/0099192 A1 * | 4/2012 | Choi | | G03B 21/62 359/453 |
| 2013/0070214 A1 * | 3/2013 | Luciano | | G03B 21/10 353/79 |
| 2013/0181901 A1 * | 7/2013 | West | | G09G 5/14 345/161 |
| 2014/0104245 A1 * | 4/2014 | Li | | H04N 21/43 345/204 |
| 2015/0092110 A1 * | 4/2015 | Li | | H04N 21/43 348/602 |

FOREIGN PATENT DOCUMENTS

| | | |
|---|---|---|
| JP | 2007226194 A | 9/2007 |
| KR | 1020020066894 A | 8/2002 |
| KR | 1020030084948 A | 11/2003 |
| KR | 1020100022034 A | 2/2010 |
| KR | 101005599 B1 | 12/2010 |
| KR | 1020120020793 A | 3/2012 |

OTHER PUBLICATIONS

International Search Report for PCT/KR2013/010896 mailed on Mar. 14, 2014.

* cited by examiner

MULTI-PROJECTION SYSTEM FOR EXTENDING VISUAL ELEMENT OF MAIN IMAGE

CROSS REFERENCE TO RELATED APPLICATION

This application claims the priority of Korean Patent Application No. 10-2013-0048085, filed on Apr. 30, 2013 in the KIPO (Korean Intellectual Property Office), which is incorporated herein by reference in its entirety.

TECHNICAL FIELD

The present invention relates to a multi-projection system for extending a visual element of a main image and, more particularly, to a multi-projection system which can extend a visual element included in a main image projected on a main projection surface to an auxiliary projection surface arranged around the main projection surface, thus maximizing the immersion and three-dimensional effect that an audience feels from the extension of the visual element.

BACKGROUND ART

Conventionally, in order to reproduce images such as movies, advertisements, etc., two-dimensional images are projected on a single screen arranged in front of a theater. However, audiences can only watch two-dimensional (2D) images under such a system.

Three-dimensional (3D) image technologies for providing audiences with 3D images have recently been developed. 3D image technologies use the principle of allowing an audience to feel the 3D effect even from a flat image when different images are presented to the left and right eyes of the audience and combined in the brain. In detail, two cameras equipped with different polarizing filters are used during filming, and the audience wears glasses with polarizing filters such that different images are presented to the left and right eyes during watching.

However, although these 3D technologies can provide audiences with 3D images, the audiences just watch the images reproduced on a single screen, which may reduce the degree of involvement in the images. Moreover, the direction of the 3D effect that the audiences feel is limited to the direction of the single screen.

Furthermore, according to the conventional 3D technologies, the audiences must wear the glasses equipped with polarizing filters during watching, which may make the audiences feel inconvenient, and different images are artificially presented to the left and right eyes, which may make some sensitive audiences feel dizzy or nausea.

Therefore, there is a need to develop of a multi-projection system of a new concept based on a single screen, which is different from conventional projection systems.

DISCLOSURE OF INVENTION

Technical Problem

An object of the present invention is to provide a multi-projection system of a new concept based on a single screen, which is different from conventional projection systems.

Moreover, another object of the present invention is to provide a multi-projection system, in which a plurality of auxiliary projection surfaces are additionally arranged around a main projection surface, and visual elements included in the main projection surface are extended to the auxiliary projection surfaces, thus maximizing the immersion and three-dimensional effect that an audience feels.

Solution to Problem

To achieve the above object, a multi-projection system in accordance with an embodiment of the present invention may comprise: a main projection surface on which a main image is reproduced; and an auxiliary projection surface arranged around the main projection surface, wherein a visual element associated with the main image is displayed on the auxiliary projection surface.

Here, a visual element included in the main image may be extended and displayed on the auxiliary projection surface.

All or part of the main image may be extended and displayed on the auxiliary projection surface.

A specific object included in the main image may be displayed on the auxiliary projection surface.

The specific object may be displayed on the auxiliary projection surface after the size of the specific object is changed based on a vanishing point included in the main image.

The specific object may be repeatedly displayed on the auxiliary projection surface.

All or part of the main image may be blurred and then displayed on the auxiliary projection surface.

The visual element may be displayed only in a partial area of the entire area of the auxiliary projection surface, which is adjacent to the main projection surface.

A separate image associated with the main image may be displayed on the auxiliary projection surface.

A plurality of auxiliary projection surfaces may be arranged around the main projection surface in a manner to surround an auditorium.

The visual element included in the main image may be extended and displayed on all of the plurality of auxiliary projection surfaces or only on some of the plurality of auxiliary projection surfaces.

The multi-projection system may further comprise: a main projection device for projecting an image on the main projection surface; an auxiliary projection device for projecting an image on the auxiliary projection surface; and a management device for controlling the operation of the main projection device and the auxiliary projection device, wherein the auxiliary projection device may project the visual element associated with the main image on the auxiliary projection surface to extend a visual effect of the image.

The management device may operate the auxiliary projection device only when a predetermined specific object is included in the main image.

The auxiliary projection device may project a specific object recognized by the management device or the entire main image.

The management device may perform the operation of recognizing the specific object in a specific time zone in all time zones when the main image is reproduced.

Light having a color associated with the main image may be projected on the auxiliary projection surface.

Light of colors associated with two or more objects included in the main image may be projected on the auxiliary projection surface.

The multi-projection system may further comprise: a main projection device for projecting the main image on the main projection surface; a lighting device for emitting light on the auxiliary projection surface; and a management device for controlling the operation of the main projection device and the lighting device, wherein the lighting device may emit light having a color associated with the main image on the auxiliary projection surface to extend a visual effect of the image.

The management device may operate the lighting device only when a predetermined specific object is included in the main image.

The management device may perform the operation of recognizing the specific object in a specific time zone in all time zones when the main image is reproduced.

Advantageous Effects of Invention

The present invention provides a multi-projection system which can extend a visual element included in a main image projected on a main projection surface (e.g., a specific object in the main image, a color included in the main image, the main image itself, etc) to a plurality of auxiliary projection surfaces arranged around the main projection surface. Therefore, it is possible to maximize the three-dimensional effect and immersion that the audience feels from the image extension using the plurality of projection surfaces.

Moreover, the present invention arranges the plurality of auxiliary projection surfaces to surround the auditorium such that a visual element included in the main image can be extended to the plurality of auxiliary projection surfaces. Therefore, according to the present invention, the audience can feel as if they are actually in a space created by the images, thus maximizing the three-dimensional effect and immersion that the audience feels.

Furthermore, the present invention may not extend an image included in the main image as it is, but may blur the image and then extend the blurred image to the auxiliary projection surfaces. Therefore, it is possible to extend the visual element included in the main image to the auxiliary projection surfaces without reducing the attention of the audience to the main image.

In addition, the present invention can change the size of an object in the main image based on a vanishing point and then extend the object with the changed size to the auxiliary projection surfaces. Therefore, with the size change based on the vanishing point, perspective can be given to the object extended to the auxiliary projection surfaces, thus maximizing the three-dimensional effect and immersion that the audience feels from the images extended to the auxiliary projection surfaces.

Moreover, the present invention displays an image on the auxiliary projection surface using the visual element included in the main image, and thus there is no need to separately prepare an image that will be projected on the auxiliary projection surface. Specifically, the present invention extends an image to the auxiliary projection surface using an object extracted from the main image, and thus there is no need to separately prepare image data for the auxiliary projection surfaces. Therefore, when a single main image content is prepared, the present invention an implements the multi-projection environment without preparing an additional image content.

Furthermore, the present invention can provide an effect of extending an image only in a specific time zone in all time zones when the main image is reproduced. Therefore, the effect of the image extension using the plurality of projection surfaces is implemented in a state the audience does not expect, thus maximizing the three-dimensional effect and immersion that the audience feels.

In addition, the present invention can maximize the three-dimensional effect and immersion of the audience in the images by extending colors included in the main image to the plurality of projection surfaces. Therefore, it is possible to maximize the three-dimensional effect and immersion of the audience feels without preparing a separate image.

MODE FOR THE INVENTION

Hereinafter, a multi-projection system for extending a visual element of a main image according to the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

Next, a multi-projection system in accordance with embodiment of the present invention will be described with reference to FIGS. 1 to 5.

Figure 1:
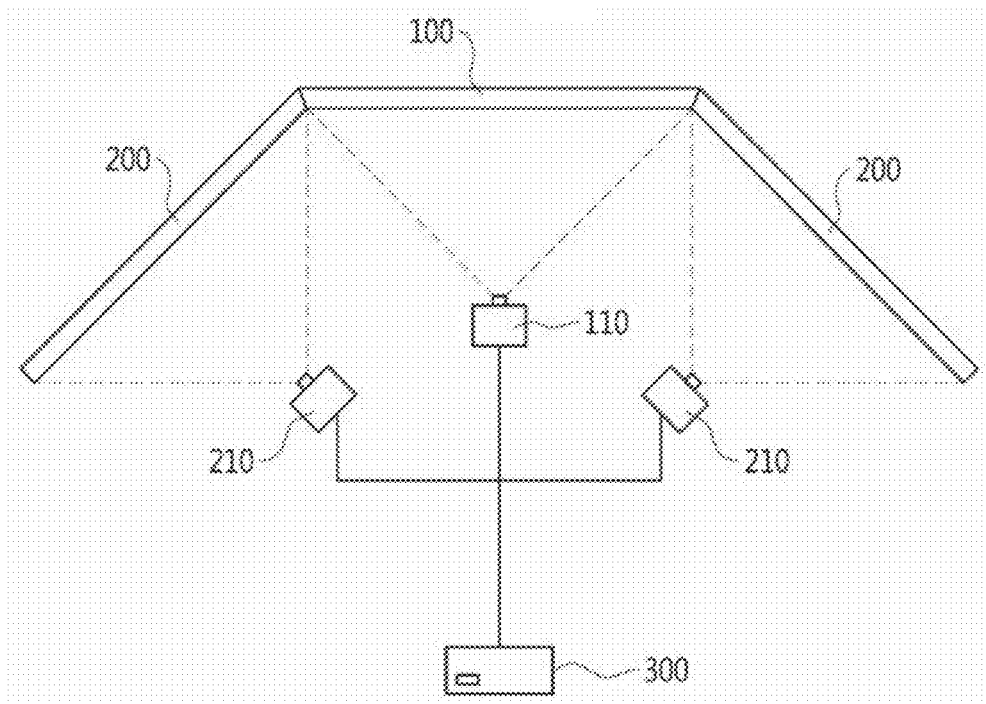
FIG. 1 is a diagram showing the configuration of a -projection system in accordance with an embodiment of the present invention.

Referring to FIG. 1, the multi-projection system in accordance with an embodiment of the present invention may comprise a main projection surface 100 on which a main image is reproduced, an auxiliary projection surface 200 arranged around the main projection surface 100, a main projection device 110 for projecting an image on the main projection surface 100, an auxiliary projection device 210 for projecting an image on the auxiliary projection surface

200, and a management device 300 for controlling the operation of the main projection device 110 and the auxiliary projection device 210.

The multi-projection system may extend a visual element included in the main image to the auxiliary projection surface 200. Specifically, the multi-projection system may extend a visual element of the main image by allowing the auxiliary projection device 210 to project the visual element included in an image of the main projection surface 100 on the auxiliary projection surface 200.

The main projection surface 100 is a projection surface on which a main image is reproduced and may correspond to a single projection surface of a conventional projection system.

The main projection surface 100 may be of various types of projection surfaces, preferably in the form of a screen.

Moreover, the main projection surface 100 may be arranged in various locations of a theater, preferably in front of an auditorium.

Meanwhile, it is preferable that the main projection surface 100 is installed to face the main projection device 110, and the main image projected by the main projection device 110 is reproduced on the main projection surface 100 arranged in the above manner.

The auxiliary projection surface 200 is a projection surface arranged around the main projection surface 100 and additionally provided to improve the immersion and three-dimensional effect of the audience.

The auxiliary projection surface 200 extends a visual element included in the main image. Specifically, the auxiliary projection surface 200 may additionally display an object (e.g., a thing, background, etc.) included in the main image, and thus the visual area of the main image can be extended by the additional display.

Moreover, the auxiliary projection surface 200 may be of various types of projection surfaces such as a screen, wall, etc. Especially, the auxiliary projection surface 200 may be implemented with a wall present in the theater, even when any additional screen is not provided in the theater. Therefore, the multi-projection system according to the present invention can be sufficiently implemented in a conventional theater including a single screen and a wall only.

Furthermore, a plurality of auxiliary projection surfaces 200 may be provided in the theater and, in this case, the plurality of auxiliary projection surfaces 200 may preferably be distributed around the boundary of the main projection surface 100. The reason for this is that when a visual element included in the main image is displayed on the plurality of auxiliary projection surfaces 200 arranged in the above manner, it provides an effect as if the main image is extended.

Meanwhile, the plurality of auxiliary projection surfaces 200 are arranged around the main projection surface 100 and may be arranged so as not to be parallel to the main projection 100. According to the prior art, an image is projected only on a single screen (i.e., a main projection surface) placed in front of the theater such that the audience watches the image reproduced on the two-dimensional screen or a 3D technology is applied to the image itself reproduced on the single screen. On the contrary, according to the present invention, the plurality of auxiliary projection surfaces 200 are three-dimensionally arranged around the main projection surface 100, and thus the three-dimensional image and immersion that the audience feels can be improved through the three-dimensionally arranged plurality of auxiliary projection surfaces 200 without applying the 3D technology to the image itself.

Moreover, it is preferable that the plurality of auxiliary projection surfaces 200 are arranged to surround the auditorium of the theater. Therefore, the audience can feel as if they are in a space created by the images through the extension of the visual effect implemented by the plurality of auxiliary projection surfaces 200, and thus the three-dimensional effect, immersion, and virtual reality that the audiences feel can be maximized.

Furthermore, the angle between the auxiliary projection surfaces 200 is not limited to a specific angle, and the auxiliary projection surfaces 200 may be arranged at various angles as long as the audience can feel the three-dimensional effect.

In addition, the plurality of auxiliary projection surfaces 200 may be arranged to be connected or adjacent to the main projection surface 100 or to be spaced from the main projection surface 100 and, even in this case, it is preferable that the plurality of auxiliary projection surfaces 200 are arranged to surround the auditorium.

Figure 3:
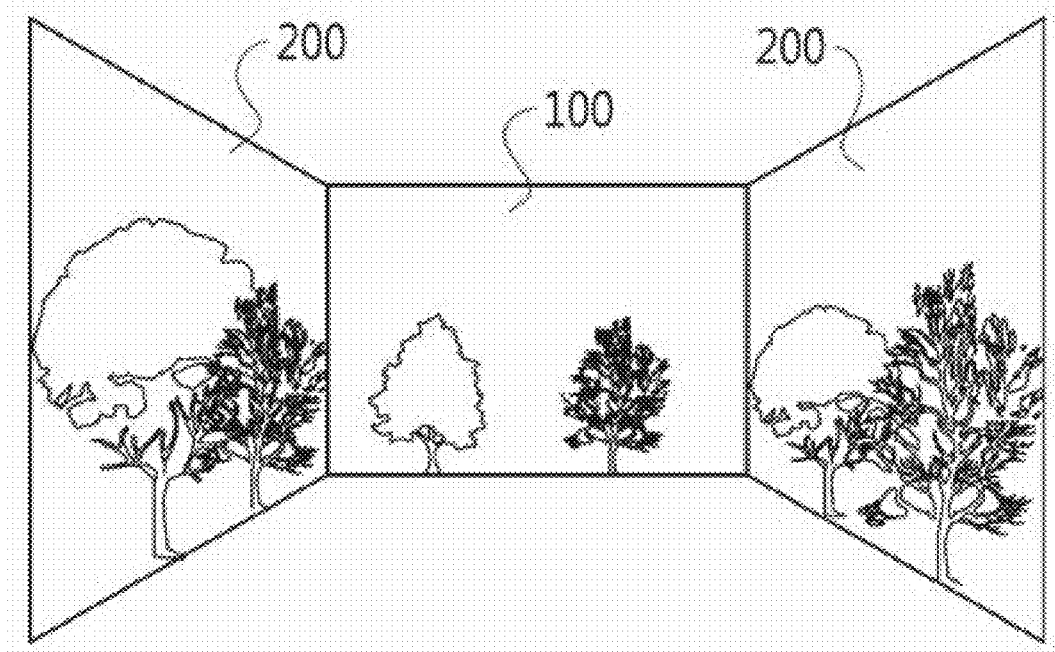
FIG. 3 is a conceptual diagram showing that an object included in a main image is extended to auxiliary projection surfaces.
Figure 4:
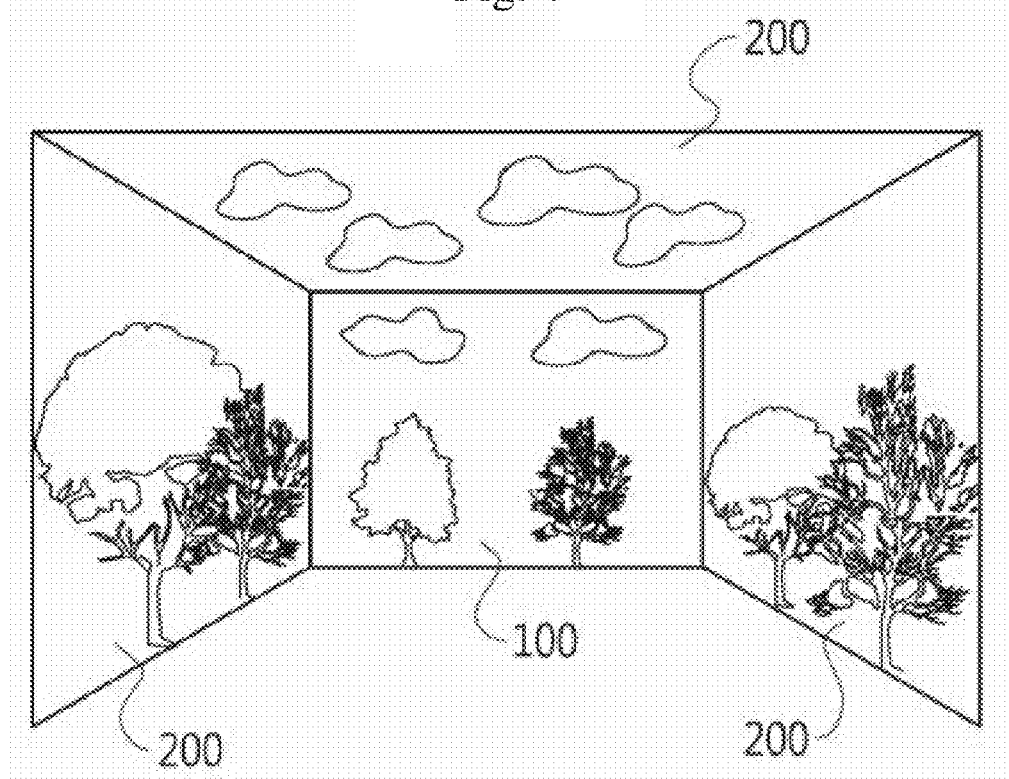
FIG. 4 is a conceptual diagram showing that a main image itself is extended to auxiliary projection surfaces.
Figure 5:
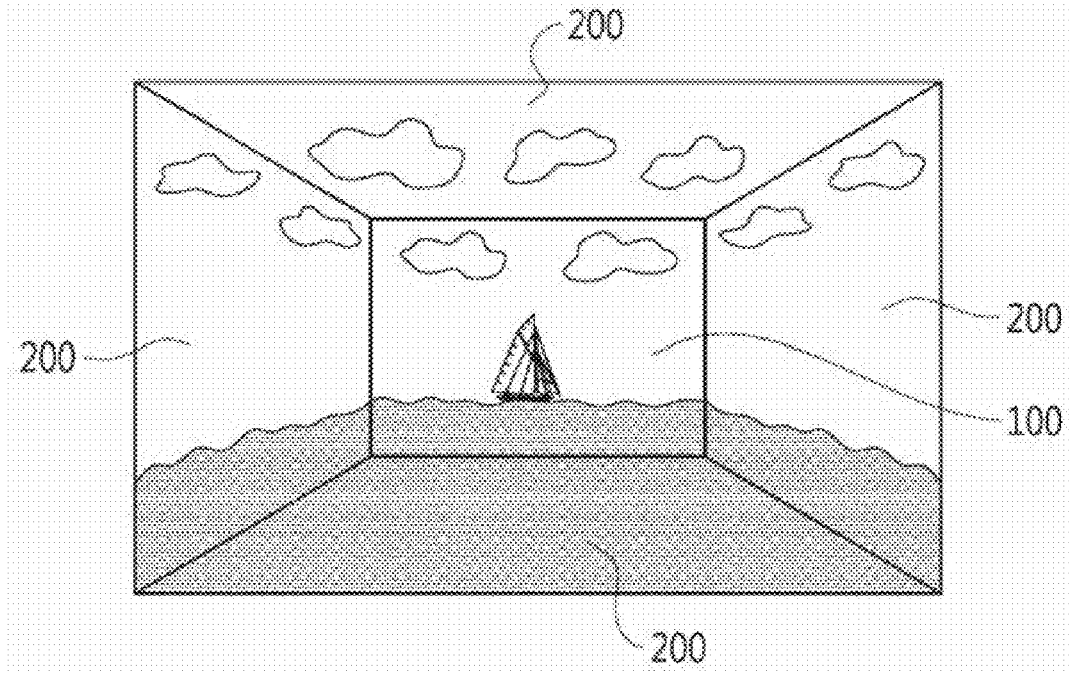
FIG. 5 is a conceptual diagram showing that an object included in a main image is blurred and then extended to auxiliary projection surfaces.

FIG. 3 shows an example in which the plurality of auxiliary projection surfaces 200 are arranged on the left and right sides with respect to the main projection surface 100, FIG. 4 is shows an example in which the plurality of auxiliary projection surfaces 200 are arranged on the left, right, and top sides with respect to the main projection surface 100, and FIG. 5 shows an example in which the plurality of auxiliary projection surfaces 200 are arranged on the left, right, top, and bottom sides with respect to the main projection surface 100.

Moreover, the plurality of auxiliary projection surfaces 200 may be composed of various types of projection surfaces such as screens, wails, etc. and may comprise different types of projection surfaces at the same time.

Meanwhile, the screen is configured to reflect the projected image such that the audience can enjoy the image and may have various types that can perform this function (even when the name of a particular component is not the screen, if it can perform the function of reflecting the projected image to the audience, it lay fall within the range of the screen).

For example, the screen may be formed of various materials such as a matte screen, a lenticular screen, a glass beaded screen, a silver screen, a high-gain screen, etc.

Moreover, the screen may be of various types such as an embedded electric screen, an exposed electric screen, a wall-mounted screen, a tripod screen, a road warrior screen, a high-brightness screen, a sound screen, etc.

Furthermore, the screen may include a water screen, a fog screen, a holographic screen, a miracle screen (using magic glass), etc. as well as various other types of screens.

In addition, the screen may also be formed of PVC, white-coated PVC, pearl gloss-coated PVC, or aluminum-coated PVC. The type of the screen may be selected depending on the size of each theater, the arrangement of the screen, the properties of the image reproduced on the screen, the resolution of the image, etc. For example, the screen formed of PVC is more suitable for a relatively small theater in terms of the reflectance based on the angle at which the image is projected, whereas, the screen formed of pearl gloss-coated PVC is suitable for a relatively large theater. Meanwhile, the screen formed of aluminum PVC has an excellent performance of reproducing a digital image or 3D image, compared to other screens.

Additionally, the wall does not represent only the wail as a word meaning, but refers to various structural surfaces present in the theater. For example the wall may include various structural surfaces in the theater such as a ceiling, floor, left wall, right wall, front wall, rear wall, etc. as well as structural surfaces on which fixtures such as curtain, panel, frame, screening equipment, etc. are provided.

The main projection device 110 is a device that projects a main image on the main projection surface 100. It is preferable that the main projection device 110 is installed to face the main projection device 110 and is installed at an appropriate distance so as to project an image of an area similar to that of the main projection surface 100.

Moreover, the main projection device 110 may be implemented by including an optical system and a heating unit in various manners. For example, the main projection device 110 may be implemented in various ways, such as by using a cathode ray tube. (CRT), using a liquid crystal display (LCD), by digital light processing (DLP) using a digital micromirror device (DMD) chip, by liquid crystal on silicon (LCoS), etc.

Furthermore, the main projection device 110 may be electrically connected to the management device 300 to be controlled by the management device 300, and the image can be projected on the main projection surface 100 under the control of the management device 300.

In addition, the main projection device 110 may transmit and receive information to and from the management device 300 through a wired or wireless communication network and, in particular, receive the main image from the management device 300. In this case, the main projection device 110 may project in real time the main image received from the management device 300 or may store the main image in an internal memory device and then project the main image later.

Additionally, the main projection device 110 may be configured to move in a three-dimensional space and, in this case, the operation of the main projection device 110 may be controlled by the management device 300.

Meanwhile, when the area of the main projection surface 100 is large, two or more main projection devices 110 may be provided. In this case, the two or more main projection devices 110 may cooperate with each other to project images on the main projection surface 100 (for example, the two or more main projection devices 110 may divide the entire area into two or more parts and project images while being synchronized with each other), and thus a unified image can be displayed on the main projection surface 100 by the cooperative operation of the two or more main projection devices 110.

Moreover, when images are projected on the main projection surface 100 by the two or more main projection devices 110, the management device 300 may generally manage the two or more main projection devices 110 and, in particular, control the two or more main projection devices 110 to project a unified image on the main projection surface 100 in cooperation with each other. For example, when the two or more main projection devices 110 project images on the main projection surface 100 in co-operation with each other, the overlapping parts of the images projected by the respective main projection devices 110 may not be smooth, which may cause heterogeneity. Here, the management device 300 may prevent the occurrence of heterogeneity by edge blending correction and image correction techniques.

The auxiliary projection device. 210 is a device that projects an auxiliary image on the auxiliary projection surface 200. As mentioned above, it is preferable that the auxiliary image is a visual element included in the main image. For example, the auxiliary image may be an object (e.g., a thing, background, etc.) included in the main image. Therefore, the auxiliary projection device 210 may project the visual element included in the main image on the auxiliary projection surface 200, and the visual area of the main image may be extended by the projection operation of the auxiliary projection device 210.

Moreover, the auxiliary projection device 210 may be implemented by including an optical system and a heating unit in various manners. For example, the auxiliary projection device 210 may be implemented in various ways, such as by using a cathode ray tube (CRT), using a liquid crystal display (LCD), by digital light processing (DLP) using a digital micromirror device (DMD) chip, by liquid crystal on silicon (LCoS), etc.

Furthermore, the auxiliary projection device 210 may be electrically connected to the management device 300 to be controlled by the management device 300, and the image can be projected on the auxiliary projection surface 200 under the control of the management device 300.

In addition, the auxiliary projection device 210 may transmit and receive information to and from the management device 300 through a wired or wireless communication network and, in particular, receive the auxiliary image from the management device 300. In this case, it is preferable that the auxiliary projection device 210 may project in real time the auxiliary image received from the management device 300.

Additionally, the auxiliary projection device 210 may be configured to move in a three-dimensional space and, in this case, the operation of the auxiliary projection device 210 may be controlled by the management device 300.

Meanwhile, when the multi--projection system comprises a plurality of auxiliary projection surfaces 200, a plurality of auxiliary projection devices 210 may also be provided. In this case, the plurality of auxiliary projection devices 210 may be installed to face the plurality of auxiliary projection surfaces 200 and integratedly controlled by the management device 300. Also, the plurality of auxiliary projection devices 210 may be connected in parallel to the management device 300 to be controlled either simultaneously or individually by the management device 300 through this parallel connection.

Meanwhile, when the area of a specific auxiliary projection surface 200 is large, two or more auxiliary projection devices 210 may be provided for the specific auxiliary projection surface 200 (e.g., two or more auxiliary projection devices may be provided for each projection surface). In this case, the two or auxiliary main projection devices 210 may cooperate with each other to project images on the specific auxiliary projection surface 200 (for example, the two or more auxiliary projection devices 210 may divide the entire area into two or more parts and project images while being synchronized with each other), and thus a unified image can be displayed on the specific auxiliary projection surface 200 by the cooperative operation of the two or more auxiliary projection devices 210.

Moreover, when images are projected on the specific auxiliary projection surface 200 by the two or more auxiliary projection devices 210, the management device 300 may generally manage the two or more auxiliary projection devices 210 and, in particular, control the two or more auxiliary projection devices 210 to project a unified image on the specific auxiliary projection surface 200 in cooperation with each other. For example, when the two or more auxiliary projection devices 210 project images on the specific auxiliary projection surface 200 in cooperation with each other, the overlapping parts of the images projected by the respective auxiliary projection devices 210 may not be smooth, which may cause heterogeneity. Here, the management device 300 may prevent the occurrence of heterogeneity by edge blending correction and image correction techniques.

The management device 300, which is a device that generally manages the multi-projection system, manages a variety of information for implementing the system and controls the operation of various devices that may be included in the system. The management device 300 may be implemented with various electronic devices and may he implemented in a single electronic device or in such a manner that several electronic devices are interconnected. For example, the management device 300 may be implemented in a single server or in such a manner that two or more servers are interconnected. Moreover, the management device 300 may be implemented in such a manner that a server and other electronic devices are interconnected or implemented in arithmetic units other than the server.

Moreover, the management device 300 may control the operation of the main projection device 110 and manage the main image projected by the main projection device 110. Also, the management device 300 may be connected to the main projection device 110 by a wired or wireless communication network to control the main projection device 110 through this connection.

Furthermore, the management device 300 may control the operation of the auxiliary projection device 210 and manage the auxiliary image projected by the auxiliary projection device 210. Also, the management device 300 may be connected to the auxiliary projection device 210 by a wired or wireless communication network to control the auxiliary projection device 210 through this connection.

In addition, when the multi-projection system comprises a plurality of auxiliary projection surfaces 200, the management device 300 may control the plurality of auxiliary projection devices 210. In this case, the management device 300 may be connected in parallel to the plurality of auxiliary projection devices 210 to control the plurality of auxiliary projection devices 210 either simultaneously or individually through this parallel connection.

Meanwhile, the management device 300 may not operate the auxiliary projection device 210 at every moment when the main image is reproduced (i.e., throughout the entire running time), but may selectively operate the auxiliary projection device 210 based on an analysis result of the main image. For example, the management device 300 can analyze the main image and operate the auxiliary projection device 210 only when a specific object is recognized from the main image. This embodiment will now be described in more detail. The management device 300 may operate the auxiliary projection device 210 by the following process. (1) The management device 300 recognizes objects included in the main image and determines whether the recognized objects correspond to predetermined specific objects. Here, the management device 300 may determine whether the predetermined specific objects are included in the main image by comparing the color and pattern of the recognized objects with those of specific objects stored in a storage unit 330. (2) When the management device 300 recognizes a predetermined specific object in the main image, the management device 300 extracts an auxiliary image from the main image and transmits the extracted image to the auxiliary projection device 210. Here, the auxiliary image may be a recognized specific object or may be the entire main image including the specific object. (3) When the auxiliary image is transmitted to the auxiliary projection device 210, the management device 300 controls the auxiliary projection device 210 to project the auxiliary image.

Moreover, the management device 300 may not perform the operation of analyzing the main image in all time zones when the main image is reproduced, but may perform the operation only in a specific time zone. Specifically, the management device 300 may analyze the main image only in a predetermined specific time zone based on a time code of the main image. Therefore, in this case, the extension of the main image by means of the auxiliary image can be implemented only in a predetermined specific time zone. (The management device 300 generates the auxiliary image and operates the auxiliary projection device 210 only when a specific object is recognized by the image analysis. Therefore, since the management device 300 does not perform the image analysis operation for the image extension in time zones other than the specific time zone, the extension of the main image by means of the auxiliary image is not implemented.)

Furthermore, the management device 300 may generate various auxiliary images, which can improve the immersion of the audience based on the main image, and project the generated various auxiliary images by means of the auxiliary projection devices. For example, the management device 300 may generate an auxiliary image that is the same as the entire main image or an auxiliary image that only includes a specific object extracted from the main image. Moreover, the management device 300 may generate an auxiliary image that repeatedly displays an object extracted from the main image or an auxiliary image that includes an object whose size is changed based on a vanishing point included in the main image.

In addition, the management device 300 may control the auxiliary projection device 210 to project a blurred image. Specifically, the management device 300 may blur the auxiliary images and then transmit the blurred auxiliary images to the auxiliary projection device 210. Also, the management device 300 may control the auxiliary projection devices 210 to project the blurred images.

Moreover, the management device 300 may allow a visual element included in the main image to be displayed only in a partial area of the entire area of the auxiliary projection surfaces 200. That is, the management device 300 may mange the system such that the visual element included in the main image is extended only in a partial area of the auxiliary projection surface 200. In this case, the management device 300 may generate an auxiliary image that is formed in a partial area of the entire image frame and project the generated auxiliary image by means of the auxiliary projection device 210 such that the visual element can be displayed in a partial area of the entire area of the auxiliary projection surfaces 200.

Furthermore, when a plurality of auxiliary projection surfaces 200 are installed in the theater, the management device 300 may extend the image using all of the plurality of auxiliary projection surfaces 200 or using only some of the plurality of auxiliary projection surfaces 200. In this case, the management device 300 may selectively control the plurality of auxiliary projection devices 210 to project the auxiliary image on all of the plurality of auxiliary projection surfaces 200 or project the auxiliary image on only some of the plurality of auxiliary projection surfaces 200.

Next, the management device 300 will be described in more detail with reference to FIG. 2.

Figure 2:
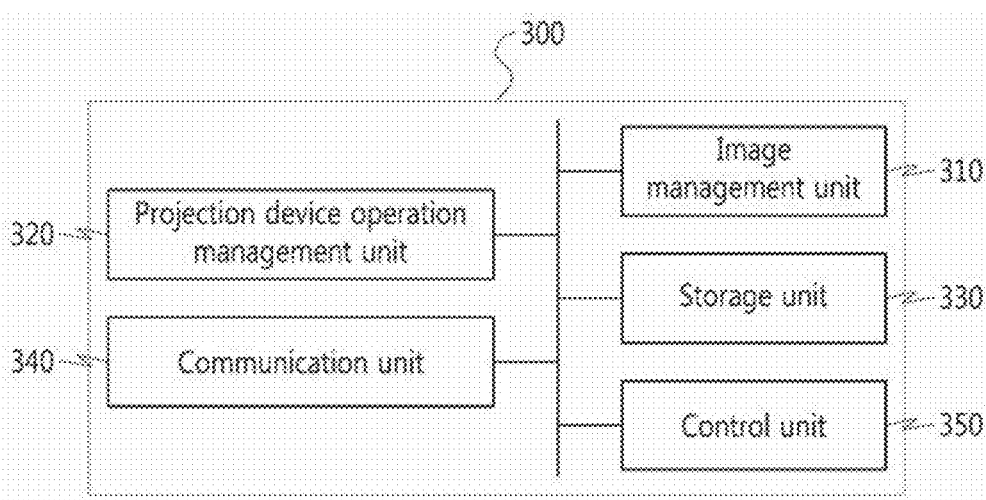
FIG. 2 is a diagram showing the configuration of a management device in accordance with an embodiment of the present invention.

Referring to FIG. 2, the management device 300 may comprise an image management unit 310, a projection device operation management unit 320, a storage unit 330, a communication unit 340, and a control unit 350.

The above components may be implemented as an electronic device or a program recorded in an electronic device.

The image management unit 310 is configured to manage a main image projected by the main projection device 110 and an auxiliary image projected by the auxiliary projection device 210.

The image management unit 310 may prepare the main image based on data received through the communication unit 340 or data stored in the storage unit 330 and transmit the prepared main image to the main projection device 110 to be projected.

Moreover, the image management unit 310 may generate the auxiliary image. Specifically, the image management unit 310 may generate the auxiliary image based on a visual element included in the main image and transmit the generated image to the auxiliary projection device 210. As mentioned above, the image management unit 310 may generate various auxiliary images (e.g., an auxiliary image using the entire main image, an auxiliary image including only a specific object in the main image, a blurred auxiliary image, an auxiliary image including an object whose size is changed based on a vanishing point, an auxiliary image formed in a partial area of the auxiliary projection surface 200, etc.), and detailed description thereof e omitted to avoid redundancy.

Furthermore, the image management unit 310 may analyze the main image and may or may not generate the auxiliary image based on the analysis result. Specifically, the image management unit 310 may determine whether a predetermined specific object (e.g., flame, cloud, sea, sky, etc.) is included in the main image and generate the auxiliary image only when the specific object is included in the main image.

The generation of the auxiliary image in conjunction with the analysis of the main image will be described in more detail below.

(1) The image management unit 310 may extract information on an object included in the main image and compare the extracted information with information on a predetermined specific object to determine whether the object included in the main image corresponds to the predetermined specific object. Here, the information compared by the image management unit 310 may include the color, appearance pattern, movement pattern, etc. of objects. For example, if there is an object that is red in color and has a red flame pattern in the main image, the image management unit 310 determines the object as a flame. Moreover, the information of the specific object used by the image management unit 310 may be obtained through the communication unit 340 or from the storage unit 330. (2-1) Meanwhile, when it is determined by the image management unit 310 that the predetermined specific object is included in the main image, the image management unit 310 generates an auxiliary image and transmits the generated image to the auxiliary projection device 210. (2-2) On the contrary, when it is determined by the image management unit 310 that the predetermined specific object is not included in the main image, the image management unit 310 does not generate the auxiliary image.

Meanwhile, the image management unit 310 may not perform the operation of analyzing the main image in all time zones when the main image is reproduced, but may perform the operation only in a specific time zone. Specifically, the image management unit 310 may analyze the main image only in a predetermined specific time zone based on a time code of the main image. Therefore, in this case, the auxiliary image can be generated only in the predetermined specific time zone.

The projection device operation management unit 320 is configured to control the operation of the main projection device 110 or the auxiliary projection device 210.

The projection device operation management unit 320 may transmit the main image to the main projection device 110 and control the operation of the main projection device 110 to project the main image. Moreover, the projection device operation management unit 320 may transmit the generated auxiliary image to the auxiliary projection device 210 and control the operation of the auxiliary projection device 210 to project the auxiliary image.

Moreover, the projection device operation management unit 320 can operate the auxiliary projection device 210 only when the auxiliary image is generated. Specifically, the projection device operation management unit 320 can operate the auxiliary projection device 210 only when the image management unit 310 recognizes the specific object included in the main image and generates the auxiliary image.

Meanwhile, when a plurality of auxiliary projection devices 210 are installed in the theater, the projection device operation management unit 320 may control the plurality of auxiliary projection devices 210. In this case, the projection device operation management unit 320 may control the operation of the plurality of auxiliary projection devices 210 either individually or simultaneously.

The storage unit 330 is configured to store various information related to the operation of the above-described management device 300, such as information on the main projection surface 100, information on the auxiliary projection surface 200, information on the main projection device 110, information on the auxiliary projection device 210, information on the main image, information on the auxiliary image, information on image correction profile for image blurring, etc.

Moreover, the storage unit 330 may store information for the analysis of the main image, specifically information on specific objects that are the basis of the image analysis. For example, the storage unit 330 may store information on predetermined specific objects such as flame, sea, sky, smoke, cloud, vehicle, aircraft, tree, mountain, forest, etc., and information on each object may include the color, appearance pattern, movement pattern, etc. of each object. Furthermore, it is preferable that the information on the color is stored as a specific range (e.g., a certain color range) rather than as a simple numerical value and the information on the patter is stored as a group of various examples.

Meanwhile, the storage unit 330 may be implemented with various electronic devices, preferably with a memory device.

The communication unit 340 is configured to transmit and receive information to and from the main projection device 110, the auxiliary projection device 210, an external server, etc.

The communication unit 340 may be implemented with various wired or wireless communication devices including a LAN module, WLAN module, etc. and may transmit and receive information through various communication networks including a TCP/IP network and various protocols.

The control unit 350 is configured to control various operations of the management device 300 including the operations of the image management unit 310, the projection device operation, the management unit 320, the storage unit 330, and the communication unit 340. The control unit 350 may be implemented in various arithmetic units.

Next, specific embodiments in which a visual element included in a main image projected on a main projection surface 100 is extended to an auxiliary projection surface 200 will be described in more detail with reference to FIGS. 6 to 10.

Figure 6:
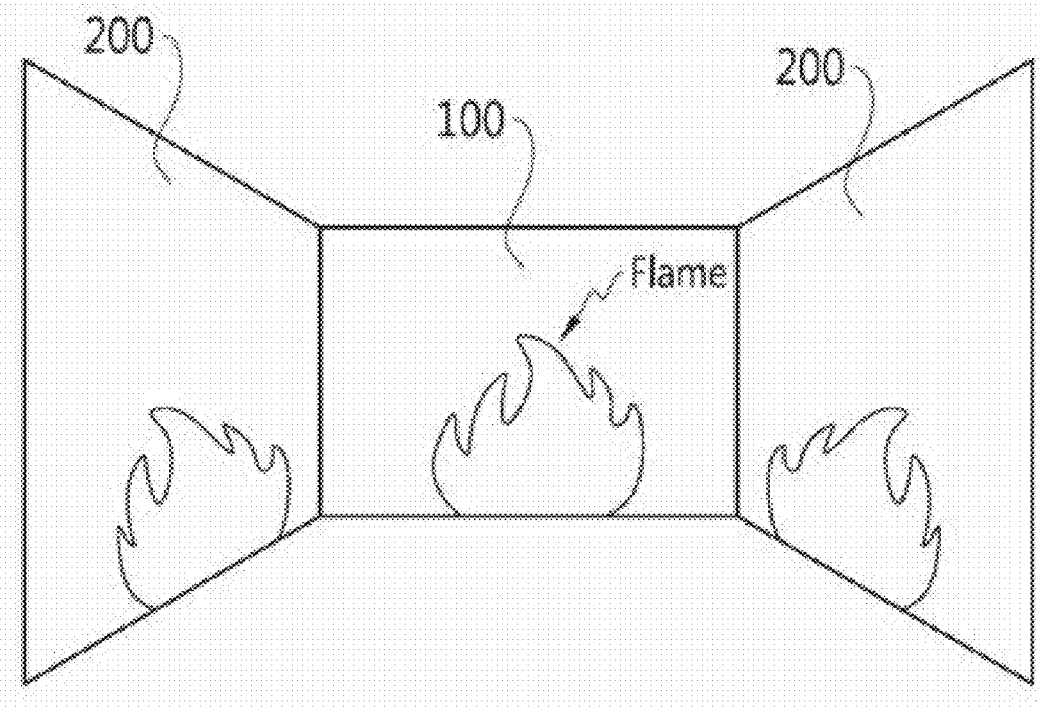
FIG. 6 is a conceptual diagram showing that an object included in a main image is changed in size based on a vanishing point and then extended to auxiliary projection surfaces.

FIG. 6 shows an embodiment in which only a specific object included in a main image is extended to auxiliary projection surfaces 200.

Referring to FIG. 6, a plurality of auxiliary projection surfaces 200 are installed around a main projection surface 100 and a specific object (e.g., flame) included in a main image is extended to the plurality of auxiliary projection surfaces 200. Thus, the audience can feel as if they are actually surrounded by the specific object created by the images, thus maximizing the reality and immersion that the audience feels.

Meanwhile, in this embodiment, the management device 300 recognizes and extracts a specific object (e.g., flame) included in the main image and generates an auxiliary image based on the extracted specific object. The generated auxiliary image is transmitted to the auxiliary projection device 210, and the auxiliary projection device 210 projects the received auxiliary image in a manner that the image of the specific object is extended and displayed.

Moreover, when the management device 300 generates the auxiliary image using the extracted specific object, the management device 300 may generate the auxiliary image based on the size and position of the specific object in the main image. Therefore, this operation allows the main image and the generated auxiliary image to be in harmony with each other. For example, when the specific object included in the main image is a flame, when the flame is located in the center of the main image, and when the flame spreads from the center to the left, the management device 300 may generate a flame image, which has the same progress direction, color, and size as the flame in the main image, as the auxiliary image that will be displayed on the auxiliary projection surface 200 located on the left of the main projection surface 100.

For reference, although the specific object is not repeatedly displayed on the auxiliary projection surface 200 in the embodiment shown in FIG. 6, the specific object may be repeatedly displayed on the auxiliary projection surface 200 in other embodiments. For example, even when a single specific object (e.g., tree) is included in the main image, a plurality of specific objects trees) may be displayed on the auxiliary projection surfaces 200.

Figure 7:
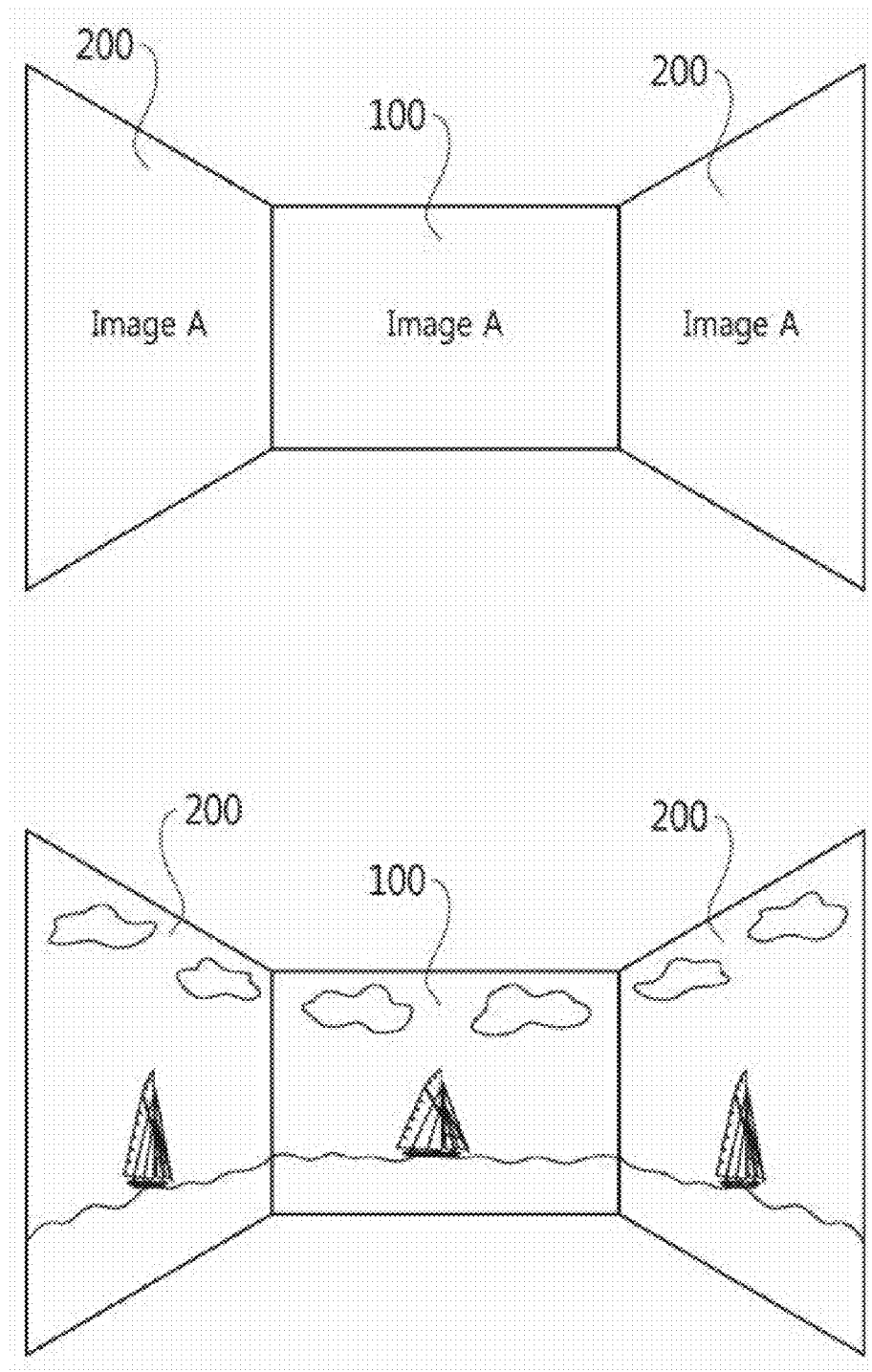
FIG. 7 is a conceptual diagram showing that a visual element included in a main image is extended only to some areas of auxiliary projection surfaces.

FIG. 7 shows an embodiment in which the entire main image is extended to auxiliary projection surfaces 200.

Referring to FIG. 7, a plurality of auxiliary projection surfaces 200 are installed around the main projection surface 100 and the entire main image is extended to the respective auxiliary projection surfaces 200. Thus, the audience can feel as if they are completely surrounded by the background created by the main image, thus maximizing the reality and immersion that the audience feels.

Meanwhile, in this embodiment, the management device 300 recognizes a specific object (e.g., cloud, sea, etc.) included in the main image and, when the specific object is recognized, uses the main image itself as the auxiliary image. Therefore, eventually, the auxiliary projection devices 210 also project the main image, and this operation of the auxiliary projection devices 210 allows the entire main image to be extended and displayed on the auxiliary projection surfaces 200.

Figure 8:
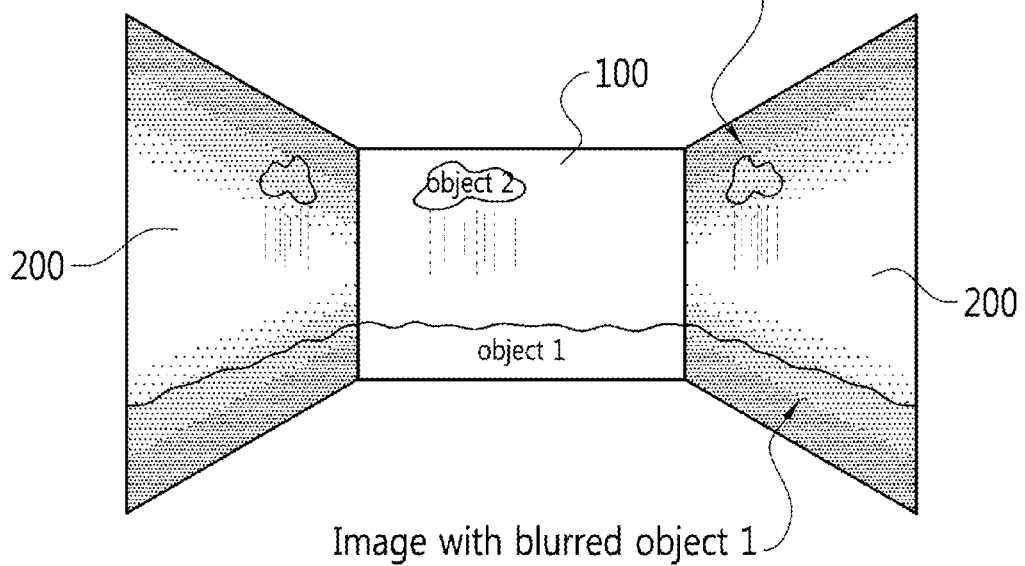
FIGS. 8 to 10 are diagrams showing examples of auxiliary projection surfaces that may be included in the present invention.

FIG. 8 shows an embodiment in which a visual element included in a main image is not extended as it is to auxiliary projection surfaces 200, but is extended after being blurred.

Referring to FIG. 8, a plurality of auxiliary projection surfaces 200 are installed around the main projection surface 100 and a visual element included in a main image (e.g., the entire main image or a specific object included in the main image) is blurred and then extended and displayed on the plurality of auxiliary projection surfaces 200. Therefore, in this embodiment, the visual element included in the main image can be extended to the auxiliary projection surfaces 200 without reducing the attention of the audience to the main image.

Meanwhile, in this embodiment, the management device 300 recognizes a specific object (e.g., cloud, sea, etc.) included in the main image and, when the specific object is recognized, generates an auxiliary image using the entire main image or a portion a specific object) of the main image. Meanwhile, the management device 300 does not transmit the generated auxiliary image as it is to the auxiliary projection device 210, but blurs the corresponding image and then transmits the blurred image. Therefore, the auxiliary projection devices 210 project the blurred auxiliary images. As a result, the visual element (e.g., the entire main image or a specific object) included in the main image is not extended as it is, but is extended after being blurred.

Figure 9:
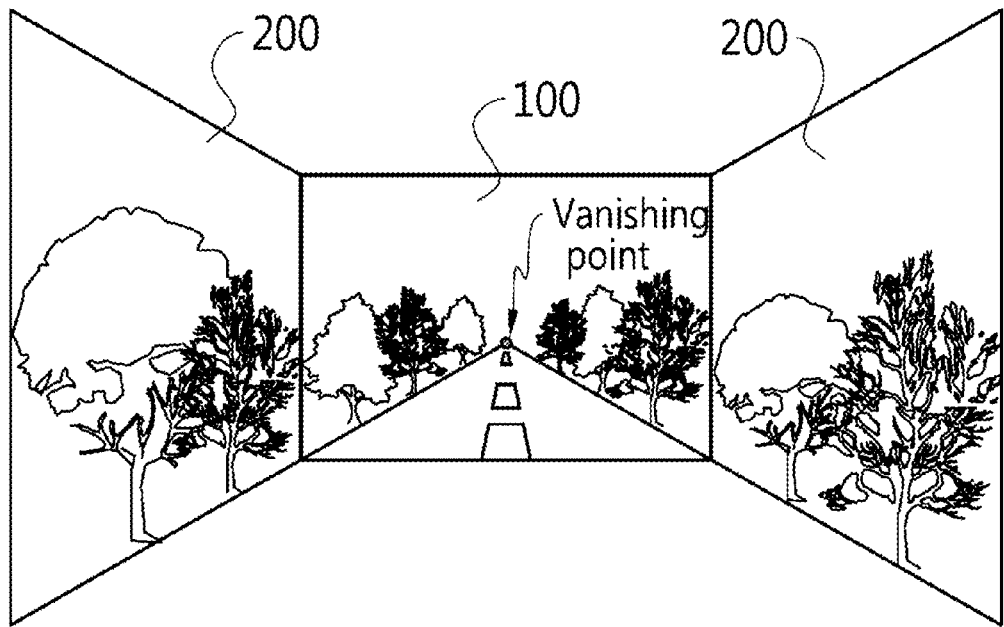

FIG. 9 shows an embodiment in which a specific object included in a main image is extended after its size is changed based on a vanishing point.

Referring to FIG. 9, a plurality of auxiliary projection surfaces 200 are installed around the main projection surface 100 and a specific object included in a main image is extended to the plurality of auxiliary projection surfaces 200. Here, it is preferable that the specific object extended and displayed on the auxiliary projection surfaces 200 has a changed size, and the changed size of the specific object may be determined based on a vanishing point in the main image. For example, the changed size of the specific object may be determined based on the position in which the specific object is displayed, based on the distance between the position and the vanishing point, etc. Therefore, perspective can be given to the object extended to the auxiliary projection surfaces 200 by the size change based on the vanishing point, thus maximizing the three-dimensional effect and immersion that the audience feels from the images extended to the auxiliary projection surfaces 200.

Meanwhile, in this embodiment, the management device 300 recognizes and extracts a specific object (e.g., tree, cloud, etc.) included in the main image and generates an auxiliary image based on the extracted specific object. In this case, the management device 300 generates the auxiliary image in a state where the size of the extracted specific object is changed. Specifically, the management device 300 generates the auxiliary image after the size of the extracted specific object is changed based on the position in which the specific object is displayed, based on the distance between the position and the vanishing point in the main image, etc. The generated auxiliary image is transmitted to the auxiliary projection device 210, and the auxiliary projection device 210 projects the generated auxiliary image in a manner that the specific object with the changed size is extended and displayed on the auxiliary projection surface 200.

Figure 10:
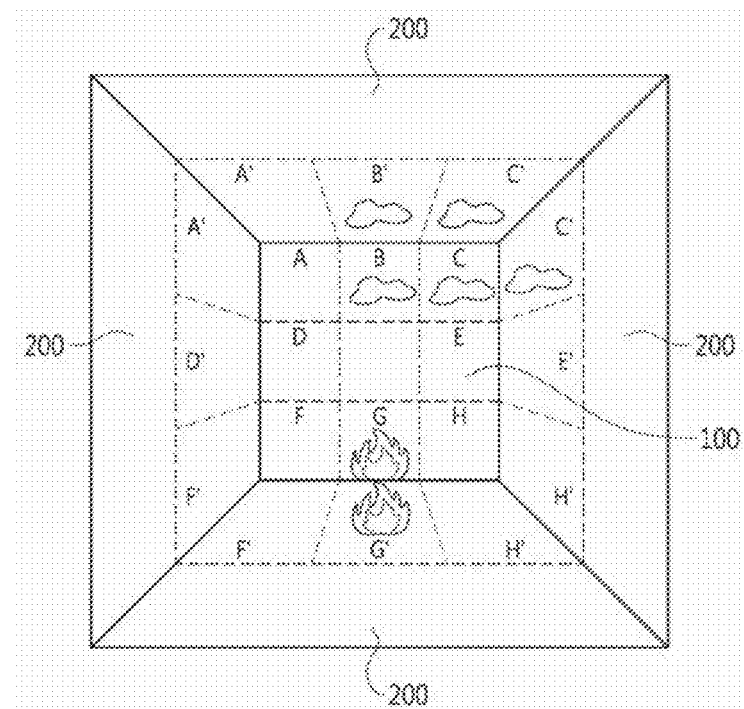

FIG. 10 shows an embodiment in which a visual element included in a main image is extended to a partial area of the entire area of auxiliary projection surfaces 200.

Referring to FIG. 10, a plurality of auxiliary projection surfaces 200 are installed around the main projection surface 100 and a specific object included in a main image is extended and displayed on the plurality of auxiliary projection surfaces 200. Here, the specific object may not be extended to the entire area of the auxiliary projection surfaces 200, but may be extended and displayed to a partial area of the auxiliary projection surfaces 200 and, in particular, may be extended and displayed on a partial area adjacent to its original position (i.e., the position on the main projection surface 100). For example, when specific objects are present in areas B, C, and G of the main projection surface 100 as shown in FIG. 10, the specific objects may not be extended to the entire area of the auxiliary projection surfaces 200, but may be extended only to areas B', C', and G' adjacent to its original position of each object.

Meanwhile, in this embodiment, the management device 300 recognizes and extracts a specific object (e.g., flame, cloud, etc.) included in the main image and generates an auxiliary image based on the extracted specific object. In this case, the management device 300 may generate the auxiliary image that is formed in a partial area of the entire image frame. Specifically, the management device 300 may generate an auxiliary image for displaying the visual element only in an area adjacent to the position of the specific object (i.e., the position on the main projection surface 100). An example of the operation of the management device 300 will now be described with reference to FIG. 10. (1) First, the management device 300 recognizes a specific object included in a main image and, in this case, also analyzes position information of the specific object (i.e., the position on the main projection surface 100). (2) Then, the management device 300 determines whether the specific object is located on the outside (A, B, C, E, F, G, or H) of the main projection surface 100. (3) When it is determined that the specific object is located on the outside (B, C, and G) of the main projection surface 100, the management device 300 generates an auxiliary image for displaying the visual element only in areas (B', C', and G') adjacent to the specific object and projects the generated image by means of the auxiliary projection device 210.

The embodiments of extending the visual effect of the main image using the visual element included in the main image (for example, extracting a specific object included in the main image and generating an auxiliary image using the extracted object) have been described above.

However, the present invention may also generate the auxiliary image for extending the visual effect by a method that does not use the visual element included in the main image.

Next, other embodiments of the present invention will be described (focusing on differences, and other than these differences, the same technical features as those mentioned above may be applied).

The present invention may also generate the auxiliary image using a separate image associated with the main image. Specifically, when an auxiliary image associated with a specific object in the main image is generated, the present invention may generate the auxiliary image using a separately provided image without extracting the specific object itself from the main image.

In this case, it is preferable that the management device 300 stores a plurality of images that can be used as the auxiliary images. Specifically, the management device 300 may store a plurality of independent images that match specific objects (e.g., tree-image A, sea-image B, flame-image C, etc.).

Therefore, when it is not desired to extend a visual effect of the main image, the management device 300 may generate an auxiliary image using a separately stored image that matches a specific object even without using the specific object included in the main image and ma extend the visual effect of the main image using the generated auxiliary image.

Other embodiments of the present invention will now be described in more detail. The management device 300 may recognize a specific object (e.g., tree) included in a main image, generate an auxiliary image using an independent image (e.g., a leaf image) that matches the recognized specific object (e.g., tree), and control the generated auxiliary image to be projected on the auxiliary projection surface 200. That is, the management device 300 may recognize the specific object (e.g., tree) included in the main image and then generate the auxiliary image using a separate image (e.g., a leaf image) that is not related to the recognized specific object, thus extending the visual effect of the main image using the generated auxiliary image.

In this case, the management device 300 may generate the auxiliary image using a separate image associated with a specific object in the main and correct the auxiliary image to be in harmony with the main image. Specifically, the management device 300 may correct the auxiliary image based on the size, position, operation information, etc. of the specific object in the main image. For example, when the object included in the main image is a tree and the tree is located on the right side, the management device 300 may generate an auxiliary image, which will be projected on the right auxiliary projection surface, based on a separate image (e.g., a leaf image) that matches the tree and correct the size, color, etc. of the auxiliary image such that leaves having a size, color, etc., which match those of the tree in the main image, are falling.

Meanwhile, the present invention may generate the auxiliary image by a method that uses all of the visual elements (e.g., specific objects) and the independent images stored for the generation of the auxiliary image.

For example, when a specific object (e.g., sea) is included in the main image, the present invention may extract the specific object (e.g., sea) and generate the auxiliary image by combining (1) the specific object (e.g., sea) extracted from the main image with (2) a separate image (e.g., a fish image) that matches the specific object.

In this embodiment, (1) the method of generating the auxiliary image by extracting a visual element included in the main image and (2) the method of generating the auxiliary image using a separate image associated with the main image, which have been described above, are combined.

Therefore, through this complex embodiment, the effect of visual extension can be maximized, and the immersion and three-dimensional effect that the audience feels can also be maximized.

Next, a multi-projection system in accordance with another embodiment of the present invention will be described with reference to FIGS. 11 to 13.

The multi-projection system in accordance with another embodiment of the present invention that will be described below is the same as the above-described embodiments in that the visual element included in the main image is extended.

However, the multi-projection system that will be described below is different from the above-described embodiments in that the visual element extended to the auxiliary projection surfaces 200 is alighting instead of the image. However, the features other than the types of the visual elements may be shared between both embodiments.

Therefore, the above-described various features related to the multi-projection system may be applied to the embodiments that will be described below.

Figure 11:
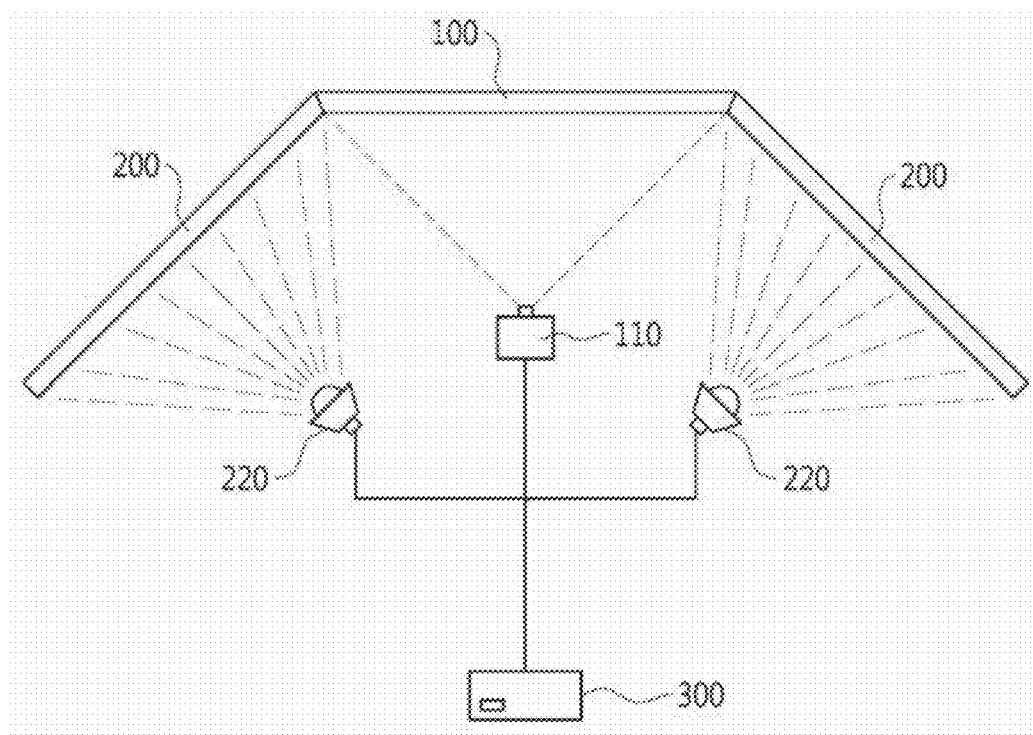
FIG. 11 is a diagram showing the configuration of a multi-projection system in accordance with another embodiment of the present invention.

Referring to FIG. 11, a multi-projection system in accordance with another embodiment of the present invention may comprise a main projection surface 100 on which a main image is reproduced, an auxiliary projection surface 200 arranged around the main projection surface 100, a main projection device 110 for projecting an image on the main projection surface 100, a lighting device 220 for emitting light on the auxiliary projection surface 200, and a management device 300 for controlling the operation of the main projection device 110 and the lighting device 220.

Moreover, the multi-projection system may extend a visual element included in the main image to the auxiliary projection surface 200. Specifically, the multi-projection system may emit light having a color associated with the main image on the auxiliary projection surface 200 by means of the lighting device 220, thus extending a visual element of the main image by this operation.

The main projection 100, the auxiliary projection surface 200, and the main projection device 110 are substantially the same as those described in the above embodiments.

The lighting device 220 is a device that emits light of a specific color on the auxiliary projection surface 200. Here, it is preferable that the color of the light emitted by the light device 200 is associated with the main image. For example, the color of the light emitted by the lighting device 220 may be an average color of the entire main image or colors of objects (e.g., a thing, background, etc.) included in the main image. Therefore, the lighting device 220 may implement the color associated with the main image on the auxiliary projection surface 200 thus extending the visual area of the main image by this operation.

Moreover, the lighting device 220 may comprise all light-emitting elements that emit light of red (R), green (G), and blue (B) and may selectively emit light of various colors using these R, G, and B light-emitting elements. Here, the light-emitting elements may be formed of various types of light-emitting elements such as heating lamps, fluorescent lamps, metal halide lamps, xenon lamps, mercury lamps, UV lamps, LEDs, semiconductor lasers, halogen lamps, etc.

Furthermore, the lighting device 220 may be electrically connected to the management device 300 to be controlled by the management device 300. The lighting device 220 may emit light on the auxiliary projection surface 200 under the control of the management device 300.

In addition, the lighting device 220 may be configured to move in a three-dimensional space and, in this case, the operation of the lighting device 220 may be controlled by the management device 300.

Meanwhile, when the multi-projection system comprises a plurality of auxiliary projection surfaces 200, a plurality of lighting devices 220 may also be provided. In this case, the plurality of lighting devices 220 may be integratedly controlled by the management device 300. Moreover, it is preferable that the plurality of lighting devices 220 may be connected in parallel to the management device 300 to be controlled either simultaneously or individually by the management device 300 through this parallel connection.

Moreover, a plurality of lighting devices 220 may be installed on a single auxiliary projection surface 200 and, in this case, the plurality of lighting devices 220 may preferably be distributed around the auxiliary projection surface 200.

The management device 300 may control the operation of the lighting device 220 and adjust the color of the light emitted by the lighting device 220. Moreover, the management device 300 may be connected to the lighting device 220 through a wired or wireless communication network to control the lighting device 220 through this connection.

Moreover, when the multi-projection system comprises a plurality of lighting devices 220, the management device 300 may control the plurality of lighting devices 220. In this case, the management device 300 may be connected in parallel to the plurality of lighting devices 220 to control the plurality of lighting devices 220 either simultaneously or individually through this parallel connection.

Meanwhile, the management device 300 may not operate the lighting device 220 at every moment when the main image is reproduced, but may selectively operate the lighting device 220 based on an analysis result of the main image. For example, the management device 300 can analyze the main image and operate the lighting device 220 only when a specific object is recognized from the main image.

Moreover, the management device 300 may not perform the operation of analyzing the main image in all time zones when the main image is reproduced, but may perform the operation only in a specific time zone. Specifically, the management device 300 may analyze the main image only in a predetermined specific time zone based on a time code of the main image. Therefore, in this case, the extension of the main image by means of the lighting device 220 can be implemented only in the predetermined specific time zone.

Next, specific embodiments in which a visual element included in a main image projected on a main projection surface 100 is extended to auxiliary projection surfaces 200 will be described in more detail with reference to FIGS. 12 and 13.

Figure 12:
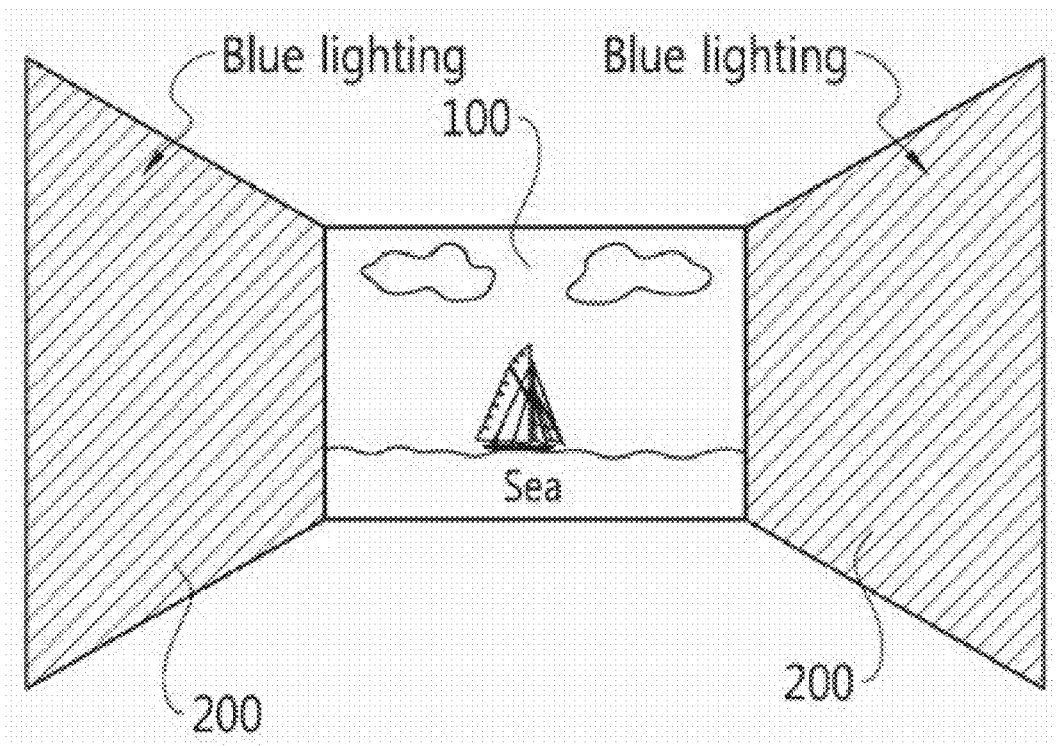
FIG. 12 is a conceptual diagram showing that a color similar to that of a main image is extended to auxiliary projection surfaces.

FIG. 12 shows an embodiment in which a color similar to that implemented by a main projection surface 100 is extended to auxiliary projection surfaces 200.

Referring to FIG. 12, a plurality of auxiliary projection surfaces 200 are installed around the main projection surface 100, and an average color implemented by a main image is extended to the plurality of auxiliary projection surfaces 200. Therefore, the audience can feel as if they are actually surrounded by a specific environment created by the images, thus improving the reality and immersion that the audience feels.

Meanwhile, in this embodiment, the management device 300 recognizes a specific object (e.g., sea, sky, etc.) included in the main image and then analyzes an average color of the main image. For example, the management device 300 calculates an average color value by analyzing the color values of all pixels included in the main image. When the average color (e.g., blue color) of the main image is analyzed, the management device 300 controls the lighting device 220 based on the analysis result. Specifically, the management device 300 controls the lighting device 220 to emit light of the analyzed average color (e.g., blue color) on the auxiliary projection surfaces 200.

Figure 13:
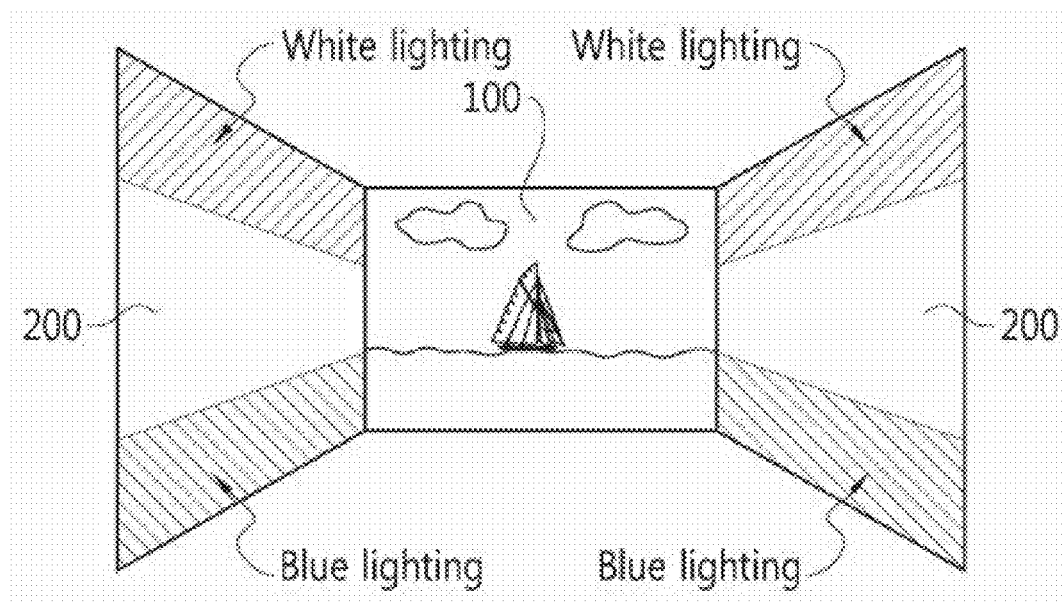
FIG. 13 is a conceptual diagram showing that colors similar to those of a main image are extended to auxiliary projection surfaces.

FIG. 13 shows an embodiment in which two or more colors (i.e., color of two or more objects) included in a main image are extended to auxiliary projection surfaces 200.

Referring to FIG. 13, a plurality of auxiliary projection surfaces 200 are installed around a main projection surface 100, and two or more colors included in the main image are extended to the plurality of auxiliary projection surfaces 200. Here, the two or more colors may be those of two or more objects included in the main image. Moreover, it is preferable that the two or more colors are displayed in positions that match the positions of the objects (e.g., white lighting is extended to the top and matches the position of cloud, and blue lighting is extended to the bottom and matches the position of sea).

Meanwhile, in this embodiment, the management device 300 recognizes two or more specific objects (e.g., sea, sky, etc.) included in the main image and then analyzes a color of each specific object image. Moreover, the management device 300 analyzes the position of each specific object. After the analysis, the management device 300 controls the lighting device 220 based on the analysis information. Specifically, the management device 300 controls the lighting device 220 to emit light of a color that is similar to that of each specific object in a position that is similar to that of each specific object.

Meanwhile, when a specific scene is created on the main image, the management device 300 may determine a color that maximizes the atmosphere of the specific scene and then control the lighting device 220. For example, when a stormy scene is created, the management device 300 may control the lighting device 220 to emit light of a dark white color.

In this case, the management device 300 may preferably recognize a color that matches the atmosphere of a specific scene based on profile information (e.g., a profile in which an object that may be displayed in an image matches a specific color) stored in a storage unit.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A multi-projection system comprising:
   a main projection surface on which a main image is reproduced;
   an auxiliary projection surface arranged around the main projection surface,
   a main projection device for projecting an image on the main projection surface;
   an auxiliary projection device for projecting an image on the auxiliary projection surface; and
   a management device for controlling the operation of the main projection device and the auxiliary projection device,
   wherein (i) the management device recognizes visual element included in the main image and determines whether the recognized visual element correspond to a predetermined specific visual element by comparing color and pattern of the recognized visual element with those of specific visual element stored in a storage unit, and (ii) when the management device determines the recognized visual element correspond to the predetermined specific visual element, the management device extracts an auxiliary image from the main image and transmits the extracted image to the auxiliary projection device,
   wherein the auxiliary projection device projects the visual element associated with the main image on the auxiliary projection surface to extend a visual effect of the image, and
   wherein the management device operates the auxiliary projection device only when the predetermined specific visual element is included in the main image.

2. The multi-projection system of claim 1, wherein a visual element included in the main image is extended and displayed on the auxiliary projection surface.

3. The multi-projection system of claim 2, wherein all or part of the main image is extended and displayed on the auxiliary projection surface.

4. The multi-projection system of claim 2, wherein a specific object included in the main image is displayed on the auxiliary projection surface.

5. The multi-projection system of claim 4, wherein the specific object is displayed on the auxiliary projection surface after the size of the specific object is changed based on a vanishing point included in the main image.

6. The multi-projection system of claim 4, wherein the specific object is repeatedly displayed on the auxiliary projection surface.

7. The multi-projection system of claim 2, wherein all or part of the main image is blurred and then displayed on the auxiliary projection surface.

8. The multi-projection system of claim 1, wherein the visual element is displayed only in a partial area of the entire area of the auxiliary projection surface, which is adjacent to the main projection surface.

9. The multi-projection system of claim 1, wherein a separate image associated with the main image is displayed on the auxiliary projection surface.

10. The multi-projection system of claim 1, wherein a plurality of auxiliary projection surfaces are arranged around the main projection surface in a manner to surround an auditorium.

11. The multi-projection system of claim 10, wherein the visual element included in the main image is extended and displayed on all of the plurality of auxiliary projection surfaces or only on some of the plurality of auxiliary projection surfaces.

12. The multi-projection system of claim 1, wherein the auxiliary projection device projects a specific object recognized by the management device or the entire main image.

13. The multi-projection system of claim 1, wherein the management device performs an operation of recognizing the specific object in a specific time zone in all time zones when the main image is reproduced.

14. The multi-projection system of claim 1, wherein light having a color associated with the main image is projected on the auxiliary projection surface.

15. The multi-projection system of claim 14, wherein light of colors associated with two or more objects included in the main image is projected on the auxiliary projection surface.

16. The multi-projection system of claim 14, further comprising:
   a lighting device for emitting light on the auxiliary projection surface,
   wherein the management device controls the operation of the main projection device and the lighting device, and
   wherein the lighting device emits light having a color associated with the main image on the auxiliary projection surface to extend a visual effect of the image.

17. The multi-projection system of claim 16, wherein the management device operates the lighting device only when the predetermined specific visual element is included in the main image.

18. The multi-projection system of claim 17, wherein the management device performs an operation of recognizing the specific visual element in a specific time zone in all time zones when the main image is reproduced.

* * * * *